United States Patent [19]

Varenchuk et al.

[11] Patent Number: 5,003,149
[45] Date of Patent: Mar. 26, 1991

[54] APPARATUS FOR OVERHEAD SUBMERGED-ARC WELDING

[75] Inventors: Pavel A. Varenchuk; Valentin D. Kovalev; Mikhail M. Ivanenko, all of Kiev; Anatoly V. Zarechensky, Zhdanov; Nikolai P. Shpak, Zhdanov; Valery A. Volkov, Zhdanov; Oleg A. Danilov, Zhdanov, all of U.S.S.R.

[73] Assignee: Institut Elektrosvarki Imeni E.O. Patona Akademii Nauk Ukrainskoi SSR, etc., Kiev, U.S.S.R.

[21] Appl. No.: 460,956

[22] Filed: Feb. 27, 1990

[30] Foreign Application Priority Data

Jun. 6, 1988 [SU] U.S.S.R. .............................. 4429058

[51] Int. Cl.[5] .............................................. B23K 9/18
[52] U.S. Cl. ................................................. 219/73.2
[58] Field of Search ................................ 219/73, 73.2

[56] References Cited

FOREIGN PATENT DOCUMENTS

| | | |
|---|---|---|
| 3430349 | 2/1986 | Fed. Rep. of Germany . |
| 3430371 | 2/1986 | Fed. Rep. of Germany . |
| 3430394 | 2/1986 | Fed. Rep. of Germany . |
| 1348111 | 10/1987 | U.S.S.R. . |
| 1397218 | 5/1988 | U.S.S.R. . |
| 1397219 | 5/1988 | U.S.S.R. . |

Primary Examiner—Clifford C. Shaw
Attorney, Agent, or Firm—Lilling and Lilling

[57] ABSTRACT

An apparatus for overhead submerged-arc welding has a rotatable hopper containing flux and accommodating a bowl communicating with a driven auger feeder having an auger rotating at a constant speed. In the bowl is extended a welding nozzle for a consumable electrode and a former is provided adjacent to the welding nozzle above the brim of the open part of the bowl facing towards a work being welded. The apparatus is also provided with a counter for counting the number of revolutions of the auger and a means for controlling flux supplied to the bowl which are connected to each other for actuating the latter when the auger has completed a preset number of revolutions. The means for controlling the amount of flux supplied to the bowl is made in the form of a shutter covering a port through which the hopper communicates with the driven auger feeder for varying the cross-sectional area of this port according to signals from the counter for counting the number of revolutions of the auger and an actuator mounted on the hopper and operatively connected with the shutter, the counter for counting the number of revolutions of the auger has an inductive pickup and a pulse count relay electrically coupled thereto.

4 Claims, 1 Drawing Sheet

APPARATUS FOR OVERHEAD SUBMERGED-ARC WELDING

BACKGROUND OF THE INVENTION

1. Field of the Invention

The invention relates to equipment for arc welding, and more specifically, it deals with an apparatus for overhead submerged-arc welding.

2. Description of the Related Art

A large number of operations is performed in the manufacture of welded structures with welding of rotatable annular welds of hollow products with a restricted access to joints being welded from the interior. Such joints include annular joints of closed vessels, annular joints of pipelines, tanks, casings, assembly welds, shell plating seams of ship hulls; longitudinal welds of large-area products which it is difficult to place to a position facilitating welding. Such joints include joints between difficult-to-position webs, segments, three-dimensional and planar sections and other members.

The overhead submerged-arc welding method is characterized by the fact that a consumable electrode and welding bath are turned at 180° in comparison with the downhand submerged-arc welding. Flux and electrode are supplied from bottom up, i.e. as though towards a ceiling. The electrode is supplied through compacted flux.

This is why this welding method will be referred to hereinbelow as overhead submerged-arc welding.

This welding method is referred to as overhead submerged-arc welding also because arc is in the body of metal.

So called overhead welds are produced as a result of such welding.

Overhead welds may be of various types, e.g. penetration overhead welds and sealing overhead welds. There may also be one-pass overhead welds and other overhead welds.

The penetration overhead welds are the welds which are first to be produced in welding a joint and which are located in the top part of sections being welded, on the opposite side of the joint with respect to the electrode supply. Further welding of the joint, i.e. producing further welds, can be carried out by any appropriate known method, the electrode being supplied on the same side as was the case in producing the penetration overhead weld, e.g. in producing inner penetration welds of rotatable annular joints of vessels, tanks, joints between bottom sections of shell plating of ships, and other structures.

The overhead submerged-arc welding of penetration welds mainly allows welding inside vessels in producing rotatable annular welds to be eliminated, and welding can also be avoided in confined spaces in producing straight welds of structures with an access on the side opposite to the ceiling.

The sealing overhead welds are the welds which are first to be produced in welding a joint and which are located in the bottom part of sections being welded on the joint side in the vicinity to the electrode supply. Further welding is carried out by any appropriate known method, the electrode being supplied on the opposite side of the joint as compared with the overhead welding.

In practice, the penetration overhead welds are produced in welding annular and longitudinal joints of structures with a restricted access to joints being welded from the interior.

The sealing welds are produced in welding elongated longitudinal joints of difficult-to-position products such as plate structures made out of segments and other members.

The one-pass overhead welds are the welds produced in welding joints of a limited thickness located over the whole welded sections. No further welding of the joint on either side is required.

Many problems arise in producing sealing and one-pass welds in forming the surface of the finished weld.

The metal in the welding bath formed during arcing by fusion of the metal being welded, electrode material and welding flux is held by the crust of partially melted flux and by forming means. Forming means may be of various configuration and size and may be, e.g. in the form of plates, backings, bars, sliders and other members.

Flux is positively pressed against a welding spot from bottom, and as flux is consumed, its stock is continually replenished. Flux may be supplied for forming the top part of the weld either on the bottom side through the gap between the edges of welded members or from top by any appropriate known method so as to form a filled flux layer. Special forming backings or flux holders may also be used.

Special problems arise in welding joints of large-size cylindrical or like products such as ship hulls and boiler units where especially high quality of welds is required and where the product should be rotated about its axis during welding, and also in welding large-size planar members which it is difficult to place in a position facilitating welding.

Known in the art is an apparatus for overhead submerged-arc welding (SU, A, 1343111), comprising a hopper containing flux pivotally mounted on a pivot pin and accomodating a bowl having its open part facing towards a work being welded. The bowl communicates with a flux supply pipe having inlet and outlet ports and an auger provided in the pipe and having a drive for supplying flux to the bowl and pressing it against the work. A welding nozzle for supplying a consumable electrode extends through the bowl. The apparatus has a pair of copying wheels, one wheel being provided on the front part of the hopper in the welding direction and the other being aligned with a forming means. The hopper supports a welding head. The hopper is mounted on a pivot pin. The same pivot pin supports the other copying wheel and the forming means.

The apparatus is provided with means for turning the hopper about its pivot pin and a means for pressing the second copying wheel and forming means against the work being welded.

The forming means is provided in the vicinity to the nozzle to be located above the brim of the open part of the bowl.

The pivot pin supporting the hopper, forming means and second copying wheel are mounted on an arm provided on a carriage having means for pressing the forming means with the copying member against the work being welded, which comprises a power actuator for moving the carriage towards the work being welded.

The prior art apparatus is so constructed as to allow both absolute value of flux pressure in the bowl and force with which the forming means is pressed against the work being welded and the ratio between them to be varied.

This apparatus allows high-quality overhead submerged-arc welding to be carried out with the desired forming of weld on either side in a broad range of process capabilities and with various types of products being welded.

However, as the forming means and the second copying wheel in this apparatus are mounted on one and the same pivot pin, the forming means is pressed away from the work in case of a substantial convexity of the joint being welded on the under-side of the work. This results in a substantial change in position of the axis of oscillations of the hopper and copying wheel with respect to the surface of the work being welded. This change in position of the axis of oscillations of the hopper results in material fluctuations of preset pressures of flux in the bowl and at different points where the welding bath is formed (upstream of the arc, in the arc zone, and in the welding bath zone and at the point of solidification of the welding bath), i.e. in a disruption of welding as a whole, hence in impaired quality of the welded joint.

In cases of a substantial concavity of the joint being welded on the underside of the work, the forming means is separated therefrom so that a substantial surplus space is formed between the working face of the forming means and the work to disrupt welding.

In addition, in welding products with geometry and assembly errors of joints, the amount of clearance between the bowl and work fluctuates in the zone between the two copying wheels which are in contact with the work so as to result in a change in flux volume available between the bowl and work thus causing fluctuations of flux pressure in the bowl and impaired welding quality as a whole.

Also known in the art is an apparatus for overhead submerged-arc welding (DE, C, 3430394), comprising a suspended pivotally mounted hopper containing flux and accommodating a bowl having its open part facing towards a work being welded and communicating with a flux supply pipe having inlet and outlet ports and an auger provided in the pipe having a drive for supplying flux to the bowl and pressing it against the work. The pipe, auger and drive for supplying flux to the bowl and pressing it against the work from a driven auger feeder. A welding nozzle for supplying a consumable electrode extends through the bowl.

A copying member is provided adjacent to the welding zone and is engageable with the work surface during welding. A forming means provided adjacent to the welding nozzle above the brim of the open part of the bowl is mounted on a suspension for oscillations in its longitudinal and transverse planes. The hopper is pivotally mounted on an arm for rotation about its pivot pin.

The pivot pin supporting the hopper is mounted on the arm which is movable in the direction towards the work being welded.

The same arm supports the forming means and the copying member mounted on pivot pins.

The support pivot pin of the forming means is in the form of a point-like abutment at the end of an arm of a double-arm suspension lever of the forming means. The fulcrum of the double-arm lever is mounted on an arm, the other arm of the lever being connected to a power actuator pivotally attached to the arm. The copying member is in the form of a copying wheel and is mounted on the pivot pin supporting the hopper.

In another embodiment of this apparatus, the pivot pin supporting the forming means comprises a point-like abutment at the end of a mounting arm located adjacent to the welding nozzle.

In this embodiment of the apparatus the copying member is in the form of projections on the face of the forming means; the pivot pin supporting the hopper is located on the side of the forming means remote from the nozzle, and the hopper is provided with a means for moving it with respect to its support pivot pin.

In this apparatus the mounting arm is also mounted on a carriage which is mounted, together with its power actuator, on a driven trolley for moving the whole apparatus in the welding direction.

This apparatus allows permanent contact between the forming means and copying member and the work being welded to be ensured during welding with various assembly errors and deviations from geometry of the joint being welded (e.g., misalignment of plate edges, convexities and concavities, undulations, clearances, and the like).

Therefore, upon any change in position of the forming means during welding caused by an admissible change in profile of the surface of the work being welded at a point of their contact, the eventual action of the forming means upon position of the hopper containing flux is eliminated.

Undesirable oscillations of the hopper upon changes in profile of the surface of the work are thus eliminated, and such welding parameters as thickness of a flux backing and flux pressure in the welding zone are stabilized.

The flux backing is an area of a compacted compressed flux layer which has a preset pressure distributed over the whole area of the flux backing and which is located between the top part of the bowl facing towards the work being welded and the surface of the work being welded to exert a local pressure upon the surface of the joint being welded in the welding zone.

This construction of the apparatus provides conditions for a smooth copying by the forming means of the surface of the joint being welded without jerks and shakes which is necessary for maintaining stable preset values of flux pressure acting upon the welding bath and upon zones in which the welding bath is formed along the joint being welded.

The construction of the prior art apparatus also provides conditions for a smooth copying of the surface of the joint being welded by the forming means and for adjusting position of the hopper with respect to the work being welded which is necessary for carrying out welding of products of different configurations.

In this apparatus, a change in position of the forming means during welding which occurs because of errors in geometry and assembly of the joint being welded does not cause a change in position of the pivot pin supporting the hopper with respect to the surface of the work being welded.

In welding with such an apparatus, owing to the creation and maintenance at a constant level of preset flux pressures at various points along the joint being welded (upstream of the arc, in the zone of the arc and welding bath, and in the zone downstream of the welding bath and up to the formed weld), the possibility of automatic conduct of welding of overhead welds and production of high-quality welded joints is ensured.

This apparatus makes it possible to carry out welding with a desired formation of weld reinforcement on either side of the joint over a broad range of process capabilities with a wide range of welded products and with large errors of assembly of joints before welding (misalignment of plate edges, undulations, convexities, and concavities, taper of bottoms in welding annular joints, e.g. in boilers and railway tanks, and the like welded structures).

Investigations showed that the flux backing thickness (the space between the surface of the outlet port of the bowl and the surface of the joint being welded filled with flux) should be kept constant during automatic overhead submerged-arc welding during the entire welding period. Theis is required to provide conditions during welding for the maintenance of constant preset flux pressures at various points along the joint being welded (upstream of the arc, in the zone of arc and welding bath, and in the zone of solidification of the weld) and for retaining the welding bath at the level of the joint being welded.

In the abovedescribed apparatus, flux moves during welding along a close-loop circuit: supply of a preset amount of flux by the auger feeder from the hopper to the bowl and spillage of (non-melted) flux that did not participate in welding from the bowl with subsequent supply thereof during the next cycle.

Flux is comminuted upon every such cycle (grading composition of flux changes) which results, as shown by investigations, in a decrease in throughput capacity of the auger feeder (decrease in the amount of flux supplied by the auger to the bowl per unit of time), hence in a decrease in the flux backing thickness if drives of the flux supply means (auger rotation) and of the driven trolley in welding longitudinal joints or rotary drive for rotating the product make use of constant speed electric motors (e.g. induction motors which are mainly used under industrial heavy-duty conditions).

However, in welding elongated welds at a constant speed, i.e. in applications where multiple passage and comminution of flux in the abovedescribed close-loop circuit occurs in the auger feeder, the prior art apparatus does not make it possible to keep the flux backing thickness constant. Owing to comminution of flux and reduction of its particle size, the flux backing thickness decreases as length of elongated welds and the number of close-loop movement cycles of flux increase. The reduction of the flux backing thickness results in fluctuations of preset flux pressures during welding at various points along the joint being welded and in a disruption of welding as a whole.

Welding should be interrupted in such cases, and the apparatus should be stopped. The comminuted (pulverulent) flux should be replaced with fresh flux of optimum grading composition. The end crater of the weld is then repaired after replacement of flux, and only then further welding of the elongated joint can continue. Quality of welding of such joints is rather low because of interruptions, presence of repaired zones, and other defects.

In addition, this apparatus does not allow preset thickness of the flux backing to be set up or be varied if necessary in welding elongated joints at a constant welding speed (e.g. in welding structures with different plate thicknesses along one and the same joint such as in making railway tanks and other products) and flux cannot be replaced with a flux of other grade or type (fine-grained, ceramic, and the like).

In all such cases process of overhead submerged-arc welding becomes complicated.

Therefore, to enhance and facilitate process of overhead submerged-arc welding at a constant welding speed and to produce a constant and high quality of welds along the entire length of a joint being welded, it is necessary, as flux is comminuted after each close-loop flux movement cycle, to increase flux supply by the auger feeder to the welding zone (bowl) in such a manner that the amount of flux supplied to the welding zone during welding at a constant welding speed remain unchanged.

Supplying a constant amount of flux to the bowl ensures the maintenance of a constant preset flux backing thickness in welding elongated welds at a constant welding speed which is necessary for high-quality overhead submerged-arc welding.

SUMMARY OF THE INVENTION

The main object of the present invention is to provide an apparatus for overhead submerged-arc welding in which owing to corresponding construction of an auger for supplying flux and pressing it against the work a possibility would be provided during welding at a preset constant welding of overhead submerged-arc welding to improve a quality of welded joints and to stabilize the preset flux pressure values in the electrode zone and at points of solidification of the welding bath which is necessary for producing high-quality welds.

This object is accomplished by an apparatus for overhead submerged-arc welding, comprising a suspended pivotally mounted rotatable hopper containing flux and accommodating a bowl having its open part facing towards a work being welded and communicating with a driven auger feeder for supplying flux to the bowl and pressing it against the work to form a flux backing, a welding nozzle for supplying a consumable electrode extending through the bowl, and a forming means provided adjacent to the welding nozzle above the brim of the open part of the bowl and mounted on a suspension for oscillations in its own longitudinal and transverse planes. According to the invention, the apparatus comprises, in combination with a known constant speed driven auger feeder, a counter for counting the number of revolutions of the auger and a means for controlling the amount of flux supplied to the bowl which are connected to each other for actuating the latter when the auger has completed a preset number of revolutions.

This construction of the apparatus for overhead submerged-arc welding in which the driven auger feeder for supplying flux to the bowl and pressing it against the work has a counter for counting the number of revolutions of the auger and a means for controlling the amount of flux supplied to the bowl which are connected to each other for actuating the latter when the auger has completed a preset number of revolutions makes it possible, in welding elongated joints, to increase flux supply to the bowl by a means controlling flux supply to bowl as flux in the hopper is comminuted, i.e. after each close-loop flux movement cycle is completed, whereby a preset flux-backing thickness can be kept constant during welding or controlled if necessary so as to stabilize the preset flux pressure values in the electrode zone and at points of solidification of the welding bath which is necessary for producing high-quality welds.

The means for controlling the amount of flux supplied to the bowl preferably comprises a shutter shutting off a port through which the hopper communicates with the driven auger feeder so as to vary the cross-sectional area of the port following signals from the counter counting the number of revolutions of the auger, and an actuator mounted on the hopper and operatively connected to the shutter.

Various structural embodiments of means for controlling the amount of flux supplied by auger feeders are known, e.g. those using diaphragms for adjusting and varying the clearance between an auger rotating at a constant speed and the inner surface of the supply pipe, and other devices.

However, the construction of the apparatus for overhead submerged-arc welding in which the means for controlling the amount of flux being supplied is made in the form of a shutter shutting off the port through which the hopper communicates with the driven auger feeder for varying the cross-sectional area of this port following signals from the counter counting the number of revolutions of the auger, and an actuator mounted on the hopper and operatively connected to the shutter is preferable as it allows optimum conditions to be provided during welding for movement of flux in the hopper in a close-loop flux movement cycle (supply to the bowl, spillage, re-supply to the bowl) and provides optimum conditions for operation of the auger in terms of its optimum load so as to enhance quality of overhead welding which is especially remarkable in welding long joints.

The port through which the hopper communicates with the supply pipe is located in the bottom part of the pipe. The cross-sectional area (opening) of this port of the supply pipe is varied during a linear movement of the shutter along the pipe body. The amount of such movement and the shutter movement time are determined and calculated beforehand, prior to the welding in accordance with the number of revolutions of the auger which rotates at a constant speed during welding. The preset auger speed is adjusted before welding by making choice of and replacing change gears in accordance with specific welding conditions (process conditions, fluxes used and their grading composition, weld length, and the like).

The amount of the shutter movement and the movement time are then set up and programmed in such a manner that the preset flux backing thickness remain unchanged along the whole joint being welded in welding at a constant welding speed by controlling the amount of flux supplied to the bowl.

The adjustment and programming of the flux backing thickness along the entire joint length are necessary both for correcting the welding parameters and in welding with the employment of different flux grades which may be changed before or during the welding.

In addition, this construction of the means for controlling the amount of flux supplied to the bowl ensures an effective variation of the amount of flux supplied which is necessary in carrying out welding for automatic maintenance of a preset flux backing thickness and for stabilizing thereby the preset flux pressures in the electrode zone and at the point of solidification of the welding bath so as to enhance quality of overhead welding.

Therefore, the apparatus for overhead submerged-arc welding enhances and improves the process of overhead submerged-arc welding and guarantees quality of welds.

The counter for counting the number of revolutions of the auger is preferably in the form of an inductive pickup which is electrically coupled to a pulse count relay.

This construction of the counter for counting the number of revolutions of the auger allows the overall control of the number of revolutions of the auger to be carried out during welding and then control operation of the pulse count relay in accordance with a preset program of operation of the auger which is necessary for automatically controlling the amount of flux supplied to the bowl during a constant speed overhead submerged-arc welding, especially in welding elongated joints and for enhancing quality of welds.

The counter for counting the number of revolutions of the auger is preferably electrically coupled to the means for controlling the amount of flux supplied to the bowl by means of a programming device.

This electrical coupling between the counter for counting the number of revolutions of the auger and the means for controlling the amount of flux supplied to the bowl makes it possible to ensure an increase in the amount of flux supplied to the bowl in accordance with a preset program during a constant speed welding of elongated joints which is necessary because of comminution of flux during welding resulting in an increase in flux density, whereby a constant flux backing thickness can be achieved or this thickness can be controlled so as to produce high-quality welded joints.

In other words, this coupling between the counter for counting the number of revolutions of the auger and the means for controlling the amount of flux supplied to the bowl makes it possible to ensure the necessary compensation for a loss of the amount of flux which fails to get to the bowl because of self-compaction in welding elongated joints so as to enhance high quality of overhead welding.

The electrical coupling which is effected by means of a programming device allows a prompt control of the amount of flux supplied to the bowl to be carried out so that the amount of flux supplied to the bowl does not depend on its changing grading composition and self-compaction occurring in welding elongated joints thus substantially enhancing quality of overhead welds as a whole.

BRIEF DESCRIPTION OF THE DRAWINGS

The invention will now be described in detail with reference to the accompanying drawings illustrating a specific embodiment of the invention, in which.

DESCRIPTION OF THE PREFERRED EMBODIMENT

Reference is now made to the accompanying drawings showing a specific embodiment of an apparatus for overhead submerged-arc welding according to the invention.

Figure 1:
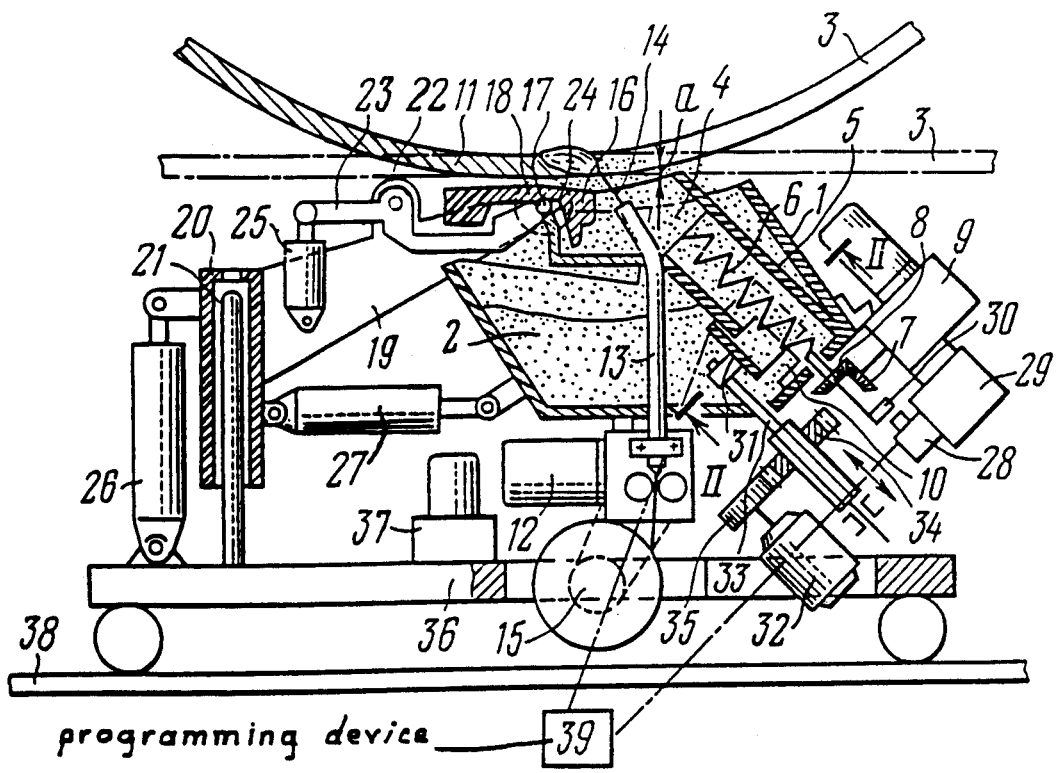
FIG. 1 schematically shows a longitudinal section view of an apparatus for overhead submerged-arc welding according to the invention.

With reference to FIG. 1, an apparatus for overhead submerged-arc welding comprises a hopper 1 containing flux 2. The hopper 1 accommodates means for supplying flux 2 and pressing it against a work 3 being welded, and a bowl 4 having inlet and outlet ports is provided in the top part of the hopper 1.

The inlet port of the bowl 4 is connected to a supply pipe 5 which houses an auger 6 connected, by means of bevel gears 7, 8, to a drive 9 for supplying flux 2 to the bowl and pressing it against the work. The drive 9 has an induction motor (a constant speed motor) which is preferred for industrial heavy-duty operating conditions.

The outlet port of the bowl 4 faces towards the work 3 being welded. The pipe 5 with the auger 6 form means for supplying flux 2 and pressing it against the work 3 being welded.

Flux 2 is supplied from the hopper 2 to the joint being welded in the following manner.

During rotation of the auger 6 by the drive 9, flux 2 is supplied through a port 10 provided in the bottom part of the supply pipe 5 and through the pipe 5 to the bowl 4.

The bowl 4 is designed for building-up a flux backing and for exerting therethrough a local pressure in the area extending along the joint being welded upstream of the arc with respect to a finished weld 11 and also along a welding bath on the underside of the work 3 being welded.

The hopper 1 is provided with a welding head 12 having a welding nozzle 13 for supplying a consumable electrode 14, e.g. from a coil 15 of electrode wire by means of a supply device of the welding head 12.

The nozzle 13 is mounted in the hopper 1 in such a manner as to extend through the bowl 4, and the end of the nozzle received in the bowl 4 is offset with respect to the supply pipe 5.

This offset position of the nozzle 13 with respect to the supply pipe 5 of the auger feeder is necessary because of non-uniform distribution of pressure exerted by flux 2 upon the work 3 being welded in the zone of flux supply from the hopper 1 to the bowl 4. At the same time, to ensure stability of parameters of overhead submerged-arc welding, it is necessary to provide for uniform pressure and distribution of flux 2 in the arc zone and in the zone adjacent to the electrode 14.

This uniform distribution of pressure of flux 2 in the zone adjacent to the electrode 14 is achieved owing to the fact that the flux 2 backing is pressed against the work being welded under a constant pressure, and uniform distribution of this pressure over the welding zone is achieved owing to friction forces developed upon relative movement of the work 3 being welded and the apparatus for overhead welding.

Surplus flux 2 that did not participate in welding overflows through the bowl 4 and spills freely back to the hopper to flow to the port 10. Circulation of flux 2 from the hopper 1 to the welding spot is thus ensured and cost-effectiveness of welding is thereby enhanced.

A forming means 16 is provided adjacent to the welding nozzle 13 in a spaced relation to the consumable electrode 14 to extend above the brim of the open part of the bowl 4. The forming means 16 is in the form of a bar of a heat-resistant heat conducting material and has a profile of its face cooperating with the flux backing and the work 3 being welded which ensures the development of necessary pressures in the welding zone and formation of the finished weld 11. The bar may be cooled, e.g. with water, air or other coolants.

For producing welded joints with a preset configuration of reinforcement on the ceiling side, the forming means 16 may be made, e.g. in the form of a slider. The slider may be adapted for a direct contact with the weld being formed. The provision of the forming means 16 in the form of a slider enhances quality of the surface of the finished weld 11.

Configuration and profile of the contact face of such a forming means 16 which cooperates during welding with the work is chosen mainly in accordance with the joint type, desired shape and dimensions of the finished weld, grade and type of fluxes used and parameters of welding conditions.

The suspended pivotally mounted rotatable hopper 1 containing flux 2 is supported by a pivot pin 17 which also supports a copying wheel 18.

The pivot pin 17 supporting the hopper 1 and copying wheel 18 is mounted or a mounting arm 19 of a carriage 20 which is provided on a guide rod 21. The welding nozzle 13 extends through the bowl 4 and is located adjacent to a rear wall thereof in the welding direction.

The forming means 16 is mounted above the brim of the open part of the bowl 4 on a suspension supported by a pivot pin 22, the forming means being mounted on the suspension for cooperation with the rear wall of the bowl 4 through a space filled with flux 2 and for oscillations in the longitudinal and transverse planes of the forming means.

The pivot pin 17 supporting the hopper 1 containing flux 2 and copying wheel 18 should allow the hopper 1 to oscillate substantially in the plane of the joint being welded.

The suspension of the forming means 16 is in the form of a double-arm lever 23. The pivot pin 22 supporting the suspension of the forming means in the form of a point-like abutment 24 is provided on one arm of the doulble-arm lever 23.

The forming means 16 is constructed and mounted on the abutment 24 of the suspension in such a manner as to ensure its self-positioning with respect to the surface of the work 3 being welded.

The other arm of the double-arm lever 23 is connected to a power actuator 25 (e.g., and air or hydraulic cylinder). The power actuator may also be in the form of spring means, counterweights, and the like. The power actuator 25 is pivotally attached to the mounting arm 19. This construction of the suspension of the forming means 16 allows the forming means 16 to copy the surface of the work 3 being welded in an especially smooth and accurate manner. This suspension also ensures compensation for friction forces developed upon cooperation of the surface of the work 3 being welded with the forming means 16 so that conditions can be provided for stabilizing and maintaining preset parameters of overhead submerged-arc welding.

A copying member, e.g. in the form of the copying wheel 18 is mounted at the end of the mounting arm 19, on the pivot pin 17. The copying wheel 18 is designed for ensuring a constant distance from the surface of the work 3 being welded to the pivot pin 17 supporting the hopper 1 containing flux 2 and the pivot pin 22 for oscillations of the suspension of the forming means 16.

This constant distance is necessary for stabilizing pressures exerted by the flux backing upon the surface of the joint being welded, whereby all parameters of overhead submerged-arc welding can be stabilized.

The carriage 20 is designed for movement in the direction towards the work 3 being welded, and for that purpose it is mounted on an appropriate guide member, e.g. on the guide rod 21.

The carriage 20 is provided with a means for pressing the copying member against the work 3 being welded, which is in the form of a power actuator 26 (e.g., an air or hydraulic cylinder) for moving the carriage in the direction towards the work 3 being welded.

To provide the necessary flux backing pressure to be exerted upon the work 3 being welded, the apparatus has a means for turning the hopper 1 about its pivot pin 17. The means for turning the hopper about its support pivot pin 17 comprises a power actuator 27 (e.g., an air or hydraulic cylinder) pivotally attached to the hopper 1 and carriage 20.

The pivot pin 17 may be mounted on the hopper in an offset position with respect to the means for supplying flux 2 and pressing it against the work 3 being welded.

In this case it is preferred that the hopper 1 be connected on the opposite side to the means for turning the hopper 1 about its support pivot pin 17.

The power actuator 27 may also be of a different type, e.g. in the form of spring means or in the form of a weight attached to the hopper 1.

This construction of the hopper 1 makes it possible to provide a highly sensitive system reacting to a change in profile of the surface of the work 3 being welded and automatically creating conditions for maintaining necessary preset pressures of flux 2 in the welding zone.

Supporting the double-arm lever 23 of the suspension of the forming means 16 on the point-like abutment 24, the provision of the pivot pin 17 supporting the hopper 1, suspension of the double-arm lever by means of the pivot pin 22 on the mounting arm 19 of the carriage 20, and the operative connection of the carriage 20 by means of the mounting arm 19 having the copying wheel 18 to the work 3 being welded, allow position of the double-arm lever 23 with respect to the work 3 being welded to be stabilized even with deviations of the configuration of structures from regular geometry and in welding structures of irregular geometrical configuration.

This stabilization of position of the double-arm lever 23 ensures constant angles of cooperation of the working face of the forming means with the surface of the work 3 being welded during welding so as to keep constant the distributed pressures of flux at various points along the joint being welded at welding spots.

The drive 9 of the auger feeder for supplying flux to the bowl 4 and pressing it against the work to form a flux backing in the apparatus according to the invention is provided with a counter for counting the number of revolutions of the auger 6 and with a means for controlling the amount of flux 2 supplied to the bowl 4 which are connected to each other for actuating said control means when the auger 6 has completed a preset number of revolutions.

This construction makes it possible to supply an additional amount of flux 2 to the bowl 4 in welding elongated joints where an intensive comminution of flux is most remarkable during welding, which causes, in carrying out a constant speed welding with a constant auger speed, a partial decrease in the flux backing thickness to impair quality of the weld being formed because of a change in flux pressure in the electrode zone resulting from this thickness decrease. Stabilization of the preset flux backing thickness "a" necessary for overhead submerged-arc welding is thereby achieved so that the flux backing thickness does not depend on changes in grading composition of flux 2 and its self-compaction in carrying out a constant speed welding with this apparatus in producing long welds thus enhancing quality of welded joints.

The counter for counting the number of revolutions of the auger 6 is made in the form of an inductive pickup 28 and a pulse count relay 29 electrically coupled thereto.

The pulse count relay 29 is mounted on the drive 9 for supplying flux 2 to the bowl 4 and pressing it against the work. The inductive counter 28 for counting the number of revolutions of the auger 6 is generally of the end type.

The pickup 28 is attached to the pulse count relay 29 and cooperates during welding with a radial lug 30 provided on the shaft of the auger 6 rotating in the field of influence of the pickup 28 through an air gap.

This construction of the counter in the form of a non-contact pickup of the number of revolutions of the auger (of a decoder counter type) and a pulse count electronic relay makes it possible to ensure high performance of the counter for counting the number of revolutions of the auger 6 and the entire apparatus for overhead submerged-arc welding according to the invention, especially under heavy-duty operating conditions, and allows welded joints of high quality to be produced.

Figure 2:
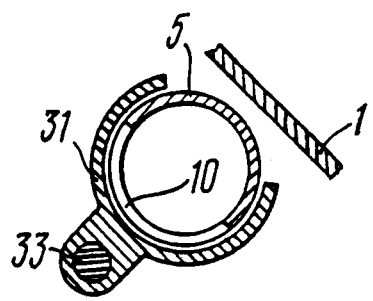
FIG. 2 is a sectional view taken along line II—II in FIG. 1.

According to the invention, a means for controlling the amount of flux 2 supplied to the bowl 4 is made in the form of a shutter 31 (FIGS. 1, 2) shutting off a port in the bottom part of the pipe 5 through which the hopper communicates with the driven auger feeder for varying the cross-sectional area of this port (port 10) following signals from the counter for counting the number of revolutions of the auger 6, and an actuator 32 (FIG. 1) mounted on the hopper 1 and operatively connected to the shutter 31 (FIGS. 1, 2).

This construction of the means for controlling the amount of flux 2 supplied to the bowl 4 (FIG. 1) ensures the necessary control of the amount of flux 2 supplied to the bowl 4 for stabilizing the flux backing thickness in accordance with a preset program and is preferable among conventional devices of the prior art designed for controlling supply of flux 2 by means of driven auger feeders with a constant speed of the auger 6.

According to the invention, the counter for counting the number of revolutions of the auger 6 is electrically coupled to the means for controlling the amount of flux supplied to the bowl by means of a programming device 39 (the coupling is conventionally shown in the drawing) which sets up a desired program of operation of the whole system including mechanisms and control circuit controlling position of the shutter 31 (FIG. 1, 2) determining the amount of opening of the port through which the hopper 1 communicates with the driven auger feeder (port 10) in the supply pipe 5 for the passage of flux 2 in accordance with the total number of revolutions of the auger 6 (or welding time) and specific welding conditions (configuration of joints being welded, types and grades of fluxes used, welding conditions, and the like).

The provision of the programming device 39 which is a member ensuring the electrical coupling is preferred from the point of view of providing a prompt control of optimum conditions for supplying flux 2 in the presence of such factors as decrease in particle size of flux 2 and its self-compaction which generally occur in welding long joints and under heavy-duty conditions (jerks, vibrations, and the like) which affect flux supply conditions, whereby high quality of formation of the welds on either side is ensured owing to a stabilization of the preset flux backing thickness.

The shutter 31 (FIGS. 1, 2) for the flux backing is connected to an actuator 32 (FIG. 1) for moving it through the supply pipe 5 for flux 2 by means of a rod 33 having a threaded portion. The threaded portion of the rod 33 cooperates with a threaded hole of a spur gear 34 so as to cause an axial movement of the rod 33 and the shutter 31 connected thereto, the shutter cooperating with the actuator 32 through a gear 35 mounted on the shaft of the actuator 32.

For moving the apparatus in the welding direction, it is provided with a driven trolley 36 to which are rigidly attached the guide rods 21 of the carriage 20, and to which is pivotally attached the power actuator 26 of the carriage 20. The driven trolley 36 has a drive 37 and moves in the welding direction along a track 38.

The trolley 36 is necessary for moving the apparatus along a joint being welded. The driven trolley 36 is designed for moving the whole apparatus along the joint being welded which is required in welding elongated longitudinal joints of difficult-to-position planar sections and plate structures as well as other structures, especially in carrying out overhead welding.

The advantages of the abovedescribed apparatus are especially remarkable in carrying out welding of elongated overhead penetration, sealing and one-pass welds.

The abovedescribed apparatus for overhead submerged-arc welding functions in the following manner.

Flux 2 is loaded in the hopper 1 (FIG. 1) before welding. Grading composition of flux 2 is preliminarily made and checked up by screening through special sieves with a preset mesh size (e.g., 0.315 mm; 0.63 mm; 1.25 mm, and the like). Composition of flux 2 designed for overhead submerged-arc welding is chosen mainly in accordance with the material of the structure to be welded, configuration of joints and welding conditions.

Flux 2 used for the welding mainly consists of $SiO_2$, MnO, CaO, MgO, $Al_2O_3$, $CaF_2$, and other components which ensure stable arcing, fusion of the work material, protection of welding bath, and formation of the finished weld 11.

Before welding, the apparatus for overhead submerged-arc welding is placed under the work 3 being welded. Two options are available in doing this.

In welding elongated straight joints of large-size products the apparatus is generally moved along the joint being welded.

In welding annular joints of rotatable structures, the apparatus remains stationary, and the work 3 is rotated about its own axis so that the joint being welded remains in the zone of the electrode 14.

When the apparatus is placed under the work 3 being welded, the power actuator 26 of the carriage 20 adjusted for welding a given product is switched on to press the copying wheel 18 mounted on the pivot pin 17 against the work 3 being welded through the carriage 20 mounted on the guide rod 21 and through the mounting arm 19. The pivot pin 17 also supports the axis of rotation of the hopper 1.

This pressure is exerted upon the copying wheel 18 during the whole joint welding period. The copying wheel 18 thus remains in permanent contact with the surface of the work 3 being welded.

Subsequently the power actuator 25 of the suspension of the forming means 16 and the power actuator 27 for rotation of the hopper adjusted for welding of a given work 3 are simultaneously switched on. The forming means 16 is pressed against, and self-positioned with respect to the surface of the joint being welded, and the open top part of the bowl 4 facing towards the work 3 is pressed against the work 3 being welded.

This pressure is exerted upon the forming means 16 by means of the double-arm lever 23 supported by the pivot pin 22 until the top side thereof comes in touch with the outer surface of the work 3 being welded and the forming means 16 is self-positioned with respect to this surface of the joint being welded.

During this self-positioning of the forming means 16 mounted on the abutment 24 of the double-arm lever 23, the forming means oscillates in its own longitudinal and transverse planes in accordance with the geometry and configuration of the joint being welded.

At the same time, the bowl 4 is positioned with respect to the surface of the work 3 being welded. This positioning of the bowl 4 is carried out by means of the power actuator 27 by turning the bowl about the pivot pin 17 supporting the hopper 1, which is mounted on the mounting arm 19.

The drive 9 of the auger 6 is then adjusted for welding of a given work 3 and is switched on to impart rotation to the auger 6 through the bevel gears 7, 8. Under the action of the rotating auger 6, flux 2 is supplied through the port 10 in the bottom part of the supply pipe 5 and through the pipe 5 to the bowl 4. Flux 2 supplied to the bowl 4 acts upon the surface of the joint being welded at the welding spot and forms a flux backing.

Then the drive 37 of the trolley 36 is switched on (it is switched on in welding longitudinal joints; the drive 37 is not switched on in welding annular joints, and a rotary drive for rotating the work is switched on, which is not shown in the accompanying drawings) and the trolley moves along the track 38.

Voltage is then applied to the consumable electrode 14, and the supply means of the welding head 12 is switched on for supplying the consumable electrode 14 from the coil 15 to the joint being welded. The joint is welded at a constant welding speed. The finished weld 11 is formed.

The accompanying drawings show an embodiment of overhead welding of an annular joint with the stationary apparatus for overhead welding, the longitudinal joint being shown for the sake of simplicity.

During the constant speed welding, flux supply to the bowl 4 is carried out under control of the programming device 39 in accordance with a preset program with a flux flow which mainly depends on the number of revolutions of the auger 6 and the amount of opening of the port 10 for the passage of flux.

It should be noted that the programming device 39 ensures operation of the entire system, including the circuit controlling position of the shutter 31 which determines the amount of opening of the port 10 for the passage of flux in accordance with the number of revolutions of the auger 6.

The shutter 31 and the port 10 may be of any other form which can be chosen in accordance with specific welding applications.

The program for controlling supply of flux 2 set up by the programming device 39 is prepared beforehand, prior to constant speed welding, in accordance with the work type, process parameters, fluxes used, their grading composition and other conditions.

At the beginning of welding, when grading composition of flux 2 in the hopper 1 has a maximum particle size, the shutter 31 covers the port 10 for the passage of flux 2 to the maximum extent.

During welding, the non-contact inductive pickup 28 records revolutions of the auger 6 owing to rotation of the radial lug 30 in its zone of influence and controls the pulse count relay 29. When a preset number of revolutions has been achieved as set up by the programming device 39, the relay 29 is actuated to switch on the actuator 32 of the means for controlling the amount of flux 2 supplied to the bowl 4 for a time preset by the program, which causes the axial movement of the rod 33 through the gears 35 an 34 to move the shutter 31 along the pipe 5 to increase the amount of opening of the port 10 for the passage of flux 2 (cross-sectional area of the inlet port of the pipe 5) thus increasing the amount of flux 2 supplied to the bowl 4.

The control of the amount of opening of the port 10 for the passage of flux 2 (cross-sectional area of the inlet port of the supply pipe 5) is carried out in accordance with the preset program as flux is comminuted during welding, whereby a constant preset flux backing thickness "a" is maintained.

The control of the amount of opening of the port 10 (cross-sectional area of the inlet port of the supply pipe 5) in case of replacement of flux 2 with another flux grade or type (finegrained, ceramic, and the like) is corrected during preparation of the welding program.

After the welding, the welding process is interrupted by consecutively switching off the welding head 12, drive 37, and power actuators 9, 25, 27. The actuator 32 is automatically deenergized upon stoppage of the auger 6 and disappearance of signals from the pickup 28 and relay 29.

The control of the amount of opening of the port 10 for the passage of flux 2 (cross-sectional area of the inlet port of the supply pipe 5) in the abovedescribed apparatus for overhead submerged-arc welding ensures a constant preset amount of flux 2 supplied by the auger 6 to the bowl 4 irrespective of the number of close-loop flux movement cycles through the pipe 5 housing the auger, i.e. irrespective of changes in grading composition of flux 2 upon its comminution. Thus a constant preset flux backing thickness is ensured without operator's interference in welding at a constant welding speed, e.g. with simultaneous welding of both bottom plates of a boiler during one revolution of the work so that preset pressures of flux 2 in the zone of the electrode 14 at solidification points of the welding bath are stabilized, whereby overhead welding can be carried out with high quality with any length of the joint being welded in producing both longitudinal and annular welds with various welding materials (fluxes and wire) and without interruptions of welding for replacing comminuted (e.g. pulverulent) flux 2 during a constant speed welding.

With the abovedescribed action of the forming means 16 and bowl 4 (through the intermediary of the flux backing) upon the work 3 being welded, overhead welds with enhanced quality of surface finish can be produced in comparison with the prior art.

The finished welds produced by this apparatus for overhead submerged-arc welding feature smooth transitions between the weld and base metal of the work being welded and a good external appearance and high surface finish even with ultimate admissible errors of sides and geometry of joints.

The apparatus for overhead submerged-arc welding according to the invention allows automatic submerged-arc welding at a constant welding speed to be carried out in producing elongated overhead welds at a greater speed of the overhead submerged-arc welding and with enhanced quality of formation of either side of the weld in comparison with prior art apparatuses and makes it possible to produce welded joints with overhead welds with enhanced quality.

To the most advantage, the apparatus for overhead submerged-arc welding, may be used in welding at a pre-set constant speed, of elongated annular and longitudinal back-up, root and single-pass welds, in the cases in which it is required a high quality of welded joints with increased requirements to the strengthening surface both from the outer and inner sides of the joint being welded, and also in cases of simultaneous welding of a number of joints of the same work respectively, with a number of apparatuses for overhead submerged arc welding (for example, annular joints of vessels, casings, vessels, boilers, pipelines, tanks or elongated longitudinal welds of large size, planer and three-dimensional sections, segments and other welded constructions).

We claim:

1. An apparatus for overhead submerged-arc welding, comprising: a suspended pivotally mounted rotatable hopper containing flux accommodating a bowl having an open part facing towards a work being welded and communicating with a driven auger feeder for supplying flux to the bowl and pressing the flux against the work to form a flux backing, a welding nozzle for supplying a consumable electrode extending through the bowl, and forming means provided adjacent to the welding nozzle above a brim of the open part of the bowl, said forming means being mounted on a suspension for movement in longitudinal and transverse planes, and further comprising a constant speed driven auger feeder, a counter for counting revolutions of the auger, and a means for controlling the amount of flux supplied to the bowl connected to the counter so that the means for controlling the amount of flux supplied to the bowl is actuated when the auger has completed a preset number of revolutions.

2. An apparatus according to claim 1, wherein the means for controlling the amount of flux supplied to the bowl comprises a shutter for shutting off a port through which the hopper communicates with the driven auger feeder and for varying the cross-sectional area of this port, and an actuator mounted on the hopper and operatively connected to the shutter, the shutter being connected to the counter so that the shutter is actuated when the auger has completed a preset number of revolutions.

3. An apparatus according to claims 1 or 2, wherein the counter for counting the number of revolutions of the auger comprises an inductive pickup and a pulse count relay electrically coupled thereto.

4. An apparatus according to claim 1, wherein the counter for counting the number of revolutions of the auger is electrically coupled to the means for controlling the amount of flux supplied to the bowl by means of a programming device.

* * * * *